(12) United States Patent
Eguchi et al.

(10) Patent No.: US 9,413,801 B2
(45) Date of Patent: *Aug. 9, 2016

(54) MEDIA STREAM INDEX MERGING

(75) Inventors: Glenn Eguchi, San Francisco, CA (US);
Asa Whillock, San Francisco, CA (US);
Kevin Streeter, San Francisco, CA (US);
Mohammed Pithapurwala, Brisbane, CA (US); Noam Lorberbaum, Mountain View, CA (US);
Seth Hodgson, Oakland, CA (US);
Srinivas Manapragada, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 493 days.

This patent is subject to a terminal disclaimer.

(21) Appl. No.: 13/536,789

(22) Filed: Jun. 28, 2012

(65) Prior Publication Data

US 2014/0006364 A1      Jan. 2, 2014

(51) Int. Cl.
| | | |
|---|---|---|
| *G06F 17/30* | (2006.01) | |
| *H04L 29/06* | (2006.01) | |
| *H04N 21/232* | (2011.01) | |
| *H04N 21/236* | (2011.01) | |
| *H04N 21/845* | (2011.01) | |
| *H04N 21/8547* | (2011.01) | |
| *H04L 29/08* | (2006.01) | |

(52) U.S. Cl.
CPC .......... *H04L 65/602* (2013.01); *H04N 21/2323* (2013.01); *H04N 21/23608* (2013.01); *H04N 21/8456* (2013.01); *H04N 21/8547* (2013.01); *G06F 17/3089* (2013.01); *G06F 17/30781* (2013.01); *H04L 67/28* (2013.01); *H04L 67/2833* (2013.01)

(58) Field of Classification Search
CPC .................... G06F 17/30247; G06F 17/30749;
G06F 17/30772; G06F 17/30781; G06F 17/3089; H04N 21/2323; H04N 21/23608; H04N 21/8456
USPC .......................................................... 707/693
See application file for complete search history.

(56) References Cited

U.S. PATENT DOCUMENTS

| | | | |
|---|---|---|---|
| 6,463,508 B1 * | 10/2002 | Wolf .................... | G06F 12/0888 711/130 |
| 8,423,606 B1 * | 4/2013 | Streeter et al. ................ | 709/203 |
| 2001/0034788 A1 * | 10/2001 | McTernan et al. ............ | 709/232 |
| 2002/0003881 A1 * | 1/2002 | Reitmeier et al. ............ | 380/210 |
| 2003/0182437 A1 * | 9/2003 | Kobayashi ........ | H04L 29/06027 709/232 |
| 2004/0221138 A1 * | 11/2004 | Rosner et al. ................. | 712/218 |

(Continued)

*Primary Examiner* — Shiow-Jy Fan
(74) *Attorney, Agent, or Firm* — Wolfe-SBMC

(57) ABSTRACT

Methods, systems, and apparatus, including computer programs encoded on a computer storage medium, for merging media stream indexes of a media stream are described in this specification. In one aspect, a method includes receiving a first media stream index at a first server system, including a first list of sequentially arranged fragment identifiers corresponding to at least a portion of multiple sequentially arranged fragments. Fragment identifiers that are potentially missing from the first index can be identified. A second media stream index including a second list of sequentially arranged fragment identifiers corresponding to at least a portion of the multiple sequentially arranged fragments can be requested from a second server system. The first and second list of the sequentially arranged fragment identifiers can be compared and the first list of sequentially arranged fragment identifiers can be reconstructed based on the comparison.

20 Claims, 5 Drawing Sheets

(56) References Cited

U.S. PATENT DOCUMENTS

| | | | |
|---|---|---|---|
| 2007/0016560 A1* | 1/2007 | Gu | G06F 17/30985 |
| 2007/0118873 A1* | 5/2007 | Houh et al. | 725/136 |
| 2008/0193099 A1* | 8/2008 | Nakai et al. | 386/52 |
| 2010/0085966 A1* | 4/2010 | Samuels et al. | 370/389 |
| 2010/0094950 A1* | 4/2010 | Zuckerman | H04L 67/1008 709/213 |
| 2010/0094964 A1* | 4/2010 | Zuckerman et al. | 709/219 |
| 2010/0235528 A1* | 9/2010 | Bocharov et al. | 709/231 |
| 2011/0083144 A1* | 4/2011 | Bocharov et al. | 725/32 |
| 2012/0179788 A1* | 7/2012 | McGowan | 709/219 |

* cited by examiner

MEDIA STREAM INDEX MERGING

BACKGROUND

This specification relates to merging media stream indexes of media streams.

Hypertext Transfer Protocol (HTTP) has become a standard protocol for Web communications. Consequently, technologies for optimizing HTTP delivery of content have been developed and have become available. Such optimized delivery has become widely accessible as it relies mostly on standard HTTP server systems that are widely supported in content delivery networks.

The basic principles of HTTP streaming involve using software on an origin server system of a content delivery network to split a media stream into small fragments (also referred to as segments or chunks) saved as separate files, and to create a playlist (i.e., a master list or index) for informing a media player client which files to get to make up a complete media stream, and where the files are located (e.g., via uniform resource locators). The media player client can download the files and can play the small fragments included in the downloaded files in an order specified by the playlist.

In HTTP Dynamic Streaming (HDS), playback of a media stream should be as robust as possible taking into account possible server-side issues. Playback at the client can suffer from occurrences, such as liveness or dropout, regardless of the built-in backend redundancy of the server systems. Liveness can occur when a server system advertises an index (e.g., fragment list) of a media stream that is not current (e.g., a "stale" view of a live media stream), and dropout can occur, when a server system's index of a media stream has gaps (e.g., the index is missing a range of fragment identifiers).

SUMMARY

This specification describes technologies related to merging media stream indexes of media streams.

In general, one innovative aspect of the subject matter described in this specification can be embodied in methods that include the actions of receiving a first index of a media stream at a first server system, where the media stream can be fragmented into multiple sequentially arranged fragments and each of the fragments can be associated with an identifier. The first index can include a first list of sequentially arranged fragment identifiers corresponding to at least a portion of the multiple sequentially arranged fragments. Fragment identifiers that are potentially missing from the first index can be identified, where the identifying can include identifying a gap in the list of sequentially arranged fragment identifiers based, at least in part, on a determined naming convention that indicates the sequential arrangement of the fragment identifiers. A second index of the media stream can be requested from a second server system, where the second index can include a second list of sequentially arranged fragment identifiers corresponding to the at least a portion of the multiple sequentially arranged fragments. The first list of sequentially arranged fragment identifiers and the second list of sequentially arranged fragment identifiers can be compared based, at least in part, on the determined naming convention. The first list of sequentially arranged fragment identifiers can be reconstructed based on the comparison.

In some implementations, identifying the gap can include identifying a discontinuity of fragment identifiers in the first list of sequentially arranged fragment identifiers based, at least in part, on the determined naming convention. In some implementations, identifying the gap can include identifying a last fragment identifier in the first list of sequentially arranged fragment identifiers, based, at least in part, on the determined naming convention. In some implementations, the method can further include the action of identifying an end of media stream indicator in the first index and terminating the requesting the second index of the media stream based on the end of media stream indicator. In some implementations, identifying can be performed (i) at startup of the first server system, (ii) at a predetermined time interval, and (iii) upon administrative request.

In some implementations, the second server system can be configured to request the second index from a first origin server of a plurality of origin servers. In some implementations, the second server system can be configured to request the second index from a second origin server of the plurality of origin servers (i) if the first origin server fails to return the second index within a predetermined time interval or (ii) upon receiving an error message in response to requesting the second index from the first origin server. In some implementations, requesting the second index can include requesting the second index through a single universal resource identifier. In some implementations, determining the naming convention can include at least one of a time stamp or a numbering scheme. In some implementations, receiving the first index can include receiving portions of the first index after receiving the first index.

In some implementations, the method can further include the action of requesting, from the second server system, potentially missing fragments associated with the potentially missing fragment identifiers from the first index, where the requesting of potentially missing fragments can occur in series until a predetermined number of requests fail to return a potentially missing fragment. Fragments associated with the potentially missing fragment identifiers from the first index can be received, and the first list of sequentially arranged fragment identifiers can be reconstructed based on the received potentially missing fragments.

In some implementations, the second server system can be configured to request each potentially missing fragment once from an origin server within a predetermined time interval. In some implementations, identifying the gap can include checking a time stamp of a last update of the index, determining a time difference between the time stamp and a current time value, and comparing the determined time difference to a predetermined time interval.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. This technology can mitigate liveness and dropout occurrences when streaming media by configuring a server system to reconstruct an index (e.g., a fragment list) of the media available on the server system to present a correct view of the media to the client by retrieving missing index information or media fragments from another server system. The server system can detect dropout and liveness within the index available on the server system, obtain another index for comparison and/or potentially missing fragments, and update the index by including fragment identifiers corresponding to the obtained index and/or potentially missing fragments. Therefore, liveness and dropout occurrences can be mitigated on the server system and may be inconsequential to the client.

Additionally, the described technology can recover a media stream even if dropouts or liveness occur for a long duration and can rectify discontinuities of a media stream by retrieving missing fragments and filling gaps in the index on the server systems that are serving the media, and thus, may increase the robustness of server side fault tolerance by healing gaps in the index and offering fragments that were initially missing in the index.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
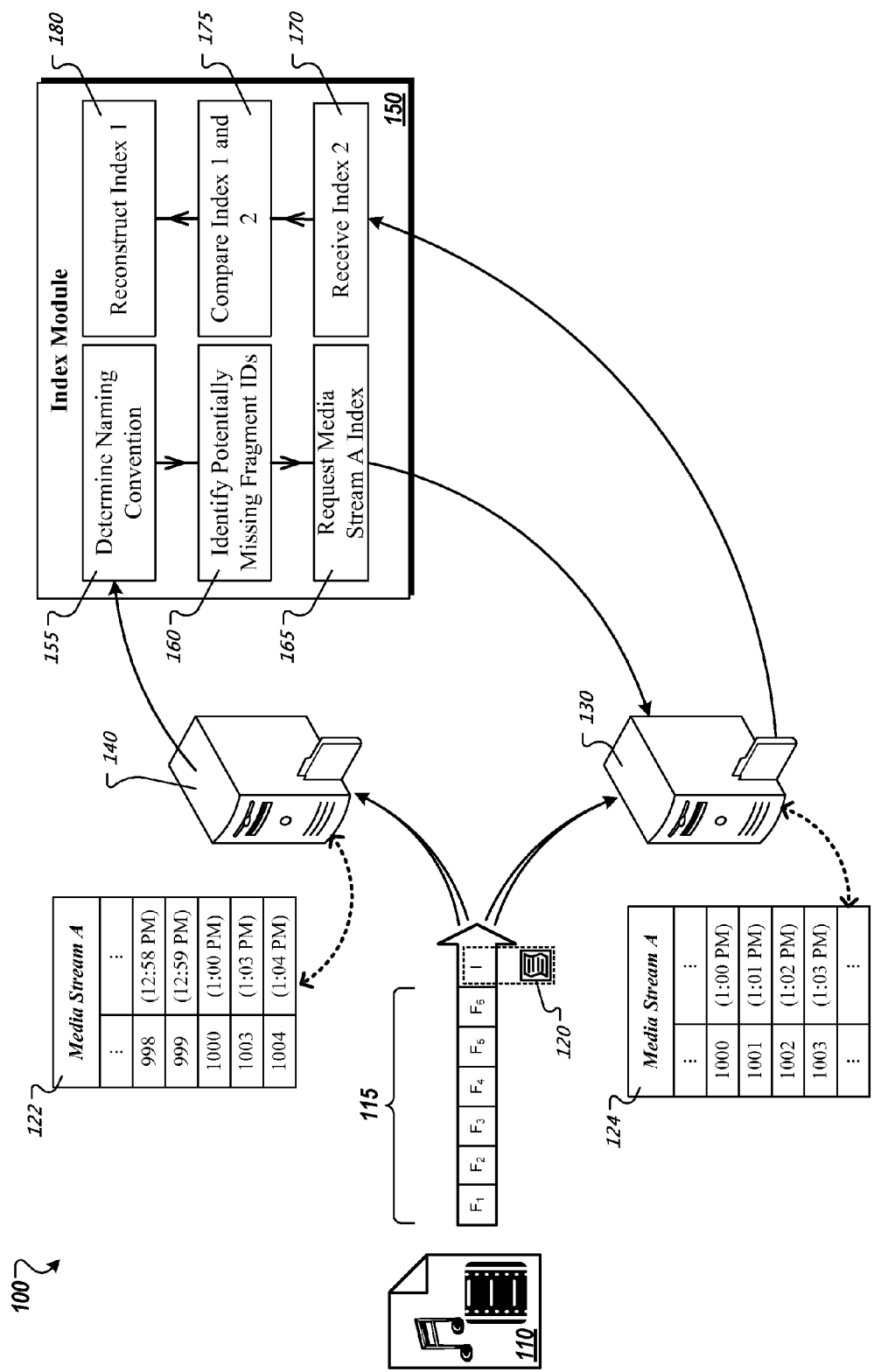
FIG. 1 shows an example of a system for merging media stream indexes.

A client system, such as a computing device that runs a media player, can initiate playback of a media stream (e.g., a video/audio live stream, HTTP live stream, etc.). A media stream may, but need not, correspond to a file. A media stream may be stored in a portion of a file that holds other media streams, in a single file dedicated to the media stream in question, or in multiple coordinated files. The media stream can be fragmented into sequentially arranged parts (i.e., fragments) that are mapped in a media stream index (e.g., a fragment list) in sequential order. Playback of a fragmented media stream at the client system can suffer from occurrences, such as liveness or dropout, regardless of the built-in backend redundancy of the server systems.

In some implementations, an encoder can receive a media stream from a source (e.g., a camera, smart phone, or any device capable of creating a media stream), and serve the media stream to one or more server systems (e.g., origin servers). In some implementations, the one or more server systems can be communicatively coupled to a proxy (e.g., a reverse proxy server system) through a network. A client system, or a component thereof (e.g., a media player), can request the media stream from the proxy. The proxy can be configured to request the media stream from a server system communicatively coupled to the proxy.

The client system can be configured to support a live offset of a predetermined number of fragment intervals. For example, the client system can be configured to store a specified number of fragments in a buffer storage medium associated with the client system. The buffer storage medium can be part of a storage system, e.g., a hard drive, a storage area network (SAN), a network-attached storage (NAS), or the like.

Liveness can occur when a server system (e.g., origin server) advertises an index of a media stream that is not current (e.g., a "stale" view of a live media stream). For example, if a connection between an encoder and one of the server systems fails and is not restored (e.g., for a duration of media stream fragments buffered in a repository), but the connection between this particular server system and a proxy continues running, the server system would no longer receive the media stream from the encoder. Because of the failed connection, the media stream index, which was received by the server system before the connection between the encoder and the server system failed, may indicate that the last fragment listed in the received media stream index is the most recent fragment even though more recent fragments may be available on other server systems.

The client system can initiate playback (e.g., live video/audio playback) of the media stream and request the most recent media stream index for the media stream from the proxy. If the proxy requests the media stream from the server system with the failed connection to the encoder, the client may receive a "stale" media stream index from the proxy. The client can begin requesting and playing the fragments listed in the media stream index received from the server system, and the playback may stall at the last fragment identified in the media stream index because the client is unaware that more recent fragments may be available on a different server system. Liveness can occur in a number of other scenarios, for example, when different server systems receive a different encoder input and one of the encoders fails, when a media server (e.g., FLASH® Media Server system) fails, or when a significant amount of latency between encoder and server system is present.

Dropout can occur when a server system advertises a media stream index that has gaps in the sequential arrangement of fragments. For example, when an encoder is streaming media to one or more server systems and the connection with one of the server systems fails for a short amount of time and is then restored, the stream to the server system may have been interrupted and the media stream index on the server system may miss entries for fragments processed by the encoder while the connection had failed.

The client system can initiate playback (e.g., live video/audio playback) of the media stream and request the most recent media stream index from the proxy. If the proxy requests the media stream index from the server system that had a failed connection with the encoder, the client system would receive a media stream index with a gap of entries of fragment identifiers corresponding to the duration of the failed connection and may not request fragments corresponding to the missing entries in the media stream index. Playback at the client system may stall, or skip over the missing fragments.

FIG. 1 shows an example of a system 100 for merging media stream indexes. The system 100 can include server systems (e.g., origin servers), such as server systems 130 and 140 that are communicatively coupled through a packet switched communication network, either directly, or through a proxy or a single universal resource identifier. The communication network can be private, e.g., a company local or wide access network, or public, e.g., the Internet. Communications between the server systems and/or proxy can be in accordance with Hypertext Transfer Protocol (HTTP), Real-Time Messaging Protocol (RTMP), Real-Time Streaming Protocol (RTSP), and the like.

The server systems 130 and 140 can receive a media stream 110. The media stream 110 can be video that includes a timed sequence of image frames and audio data. In some implementations, the server systems 130 and 140 can store the media stream 110 to be streamed on demand to a client system. In this case, the server systems 130 and 140 can store the media stream 110 on persistent storage medium associated with the server systems 130 and 140. The storage medium associated with the server systems 130 and 140 can be part of a storage system, e.g., a hard drive, a storage area network (SAN), a network-attached storage (NAS), or the like.

In some implementations, the server systems 130 and 140 can be connected to one or more media stream sources (e.g., media stream encoder and/or media stream packager) that are associated with one or more image/audio capture systems, such as video cameras. In this case, the media stream sources can process the captured images, generate one or more media streams from the processed images and stream live or near-live the one or more generated media streams to the server systems 130 and 140.

In some implementations, the media stream 110 can be generated and stored as multiple fragments 115. The fragments 115 of the media stream 110 can include video data having playback duration (e.g., 10 or 15 seconds). The fragments 115 of the media stream 110 can be sequentially arranged such that the fragments can be processed in a defined order. For example, the fragments 115 can be arranged by a sequential numbering scheme (e.g., 998, 999, 1000, 1001, etc.), by time stamps (e.g., 1:00 PM, 1:01 PM; 1:02 PM, etc.), by time offsets (e.g., 5 sec., 10 sec., 15 sec.), or a combination of these. The media stream 110 can include a media stream index 120 (e.g., a fragment list) mapping the sequential order of the fragments.

In some implementations, the media stream index 120 maps the fragments of the media stream to corresponding indicators of storage locations where the respective files of the fragments listed in the media stream index 120 are stored. In some implementations, the storage location indicators can be uniform resource locator (URL) addresses referring to the respective fragment file locations. The media stream index 120 can include, but is not limited to, information related to the media stream, such as fragment identifiers, time stamps, time offsets, end of media stream indicators, fragment locators (e.g., uniform resource locators), and a name of the media stream.

The server systems 130 and 140 can receive and store the media stream index 120. The media stream index 120 can be received from a media stream source (e.g., media stream encoder and/or media stream packager) that is associated with a video/audio capture system (e.g., video camera, smart phone, etc.). In some implementations, the server system 140 can store a version 122 of the media stream index 120 and the server system 130 can store a version 124 of the media stream index 120.

The media stream indexes 122 and 124 can be updated as new fragment information is available at the media stream source. Even though the media stream indexes 122 and 124 can be based on the same media stream index 120, the contents of the media stream indexes 122 and 124 may be different, for example, because of connection stability or configuration between the media stream source and the server systems 130 and 140. In some implementations, the media stream indexes 122 and 124 can be received from different media sources, such as different media stream encoders and/or media stream packagers connected to server systems 140 and 130 respectively that are associated with the video/audio capture system.

In some implementations, the server systems 130 and 140 can include an index module to analyze the received indexes 122 and 124. For example, index module 150 of the server system 140 can determine a naming convention 155 indicating the sequential arrangement of the fragment identifiers (e.g., 998, 999, 1000, etc.) in the media stream index 122. The naming convention 155 can be based on a numbering scheme, such as time stamps, time offsets, or any other method for indicating a sequential arrangement of the media stream fragments. In some implementations, the index module 150 can identify potentially missing fragment identifiers 160 in the media stream index 122, for example, based on the determined naming convention 155 indicating the sequential arrangement of the media stream fragment identifiers.

Index module 150 can submit a request 165 for an index of the media stream 110 from another server system, such as server system 130. The request 165 for the media stream index can be routed through a proxy or a single universal resource identifier, or directly to another server system. The server system receiving the request for the media stream index can respond to the request. For example, server system 130 can respond to the request 165 for an index of media stream 110 by returning a media stream index 124 for the media stream 110 to the server system 140. The media stream index 124 can be submitted through a proxy managing communication between server systems 130 and 140.

In some implementations, the index module 150 can compare 175 the index 124, received 170 from server system 130 in response to the request 165, and the index 122. Based on the comparison of the indexes 124 and 122, the server system 140 can reconstruct index 122 to include fragment identifiers that are listed in the media stream index 124, but not in the media stream index 122. For example, the reconstructed index 180 can include all fragment identifiers that are listed in the index 124 in addition to the fragment identifiers that were listed in the media stream index 122 before the media index request 165. The comparison and/or reconstruction of the index can also be performed on a subset of the index rather than the entire index (e.g., for the most recent 100 fragment identifiers).

Figure 2:
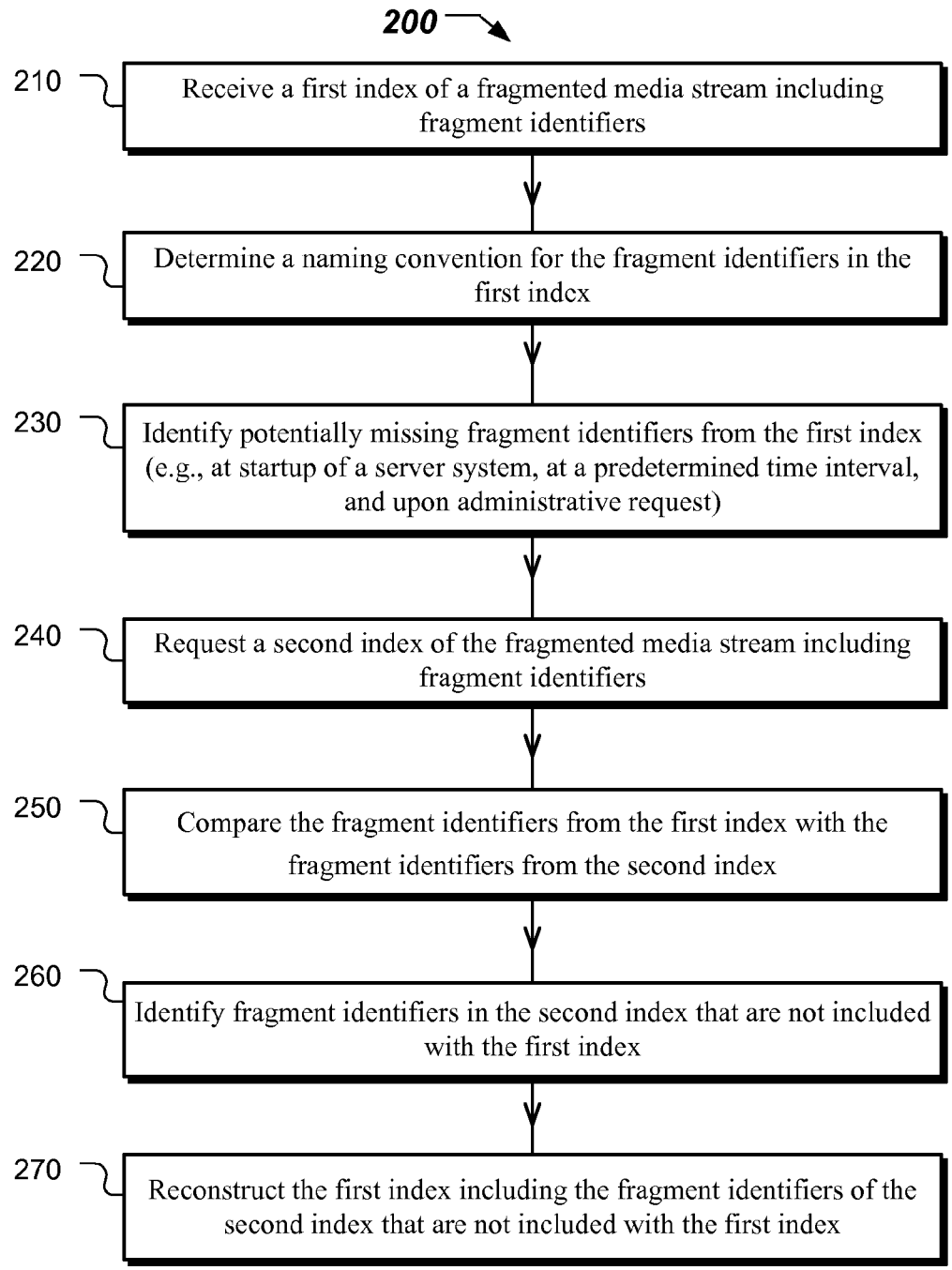
FIG. 2 shows an example of a process for merging media stream indexes.

FIG. 2 shows an example of a process 200 for merging media stream indexes. The process 200 can be implemented, for example, at a server system, such as server systems 130 and 140. Additionally, process 200 can be implemented at a proxy or client system. A media stream index can be received 210. The media stream corresponding to the media stream index can be fragmented into sequentially arranged fragments. The media stream index can include fragment run entries and information, such as fragment identifiers, time stamps, time offsets, end of media stream indicators, fragment location (e.g., uniform resource locator), media stream name, or other information related to the media stream. In some implementations, the media stream index can map the sequential arrangement of the fragments, for example, based on the fragment identifiers, time stamps, or time offsets.

In some implementations, a server system receiving the media stream index can initiate a validation process of the media stream index. For example, the validation can be initiated at boot time initialization (e.g., startup) of the server system to ensure the server system starts with a clean media stream index, periodically to ensure that an issue (e.g., liveness or dropout) is detected and recovery can be initiated as soon as possible, and at user request (e.g., by an administrator) to initiate a recovery procedure that can be more extensive to recover media streams if other recovery procedures cannot solve the problem. In some implementations, validation of the media stream index at boot time initialization and periodic validation can be initiated automatically, whereas a recovery procedure initiated by user command can be triggered manually.

In some implementations, a user (e.g., administrator) can be presented with information on the status of media streams and an indication whether a media stream suffers from dropout or liveness that cannot be rectified through automatic recovery procedures. For example, the user can receive information including an array of currently active media streams, dropout or liveness errors that were detected for a media stream and have not been rectified through automatic recovery procedures (e.g., an array of detected gaps that are not filled, the last time stamp of an update of a stale index, a number of times gaps have been detected for a media stream, and a number of liveness issues detected for a media stream), and status of all media streams (e.g., a number of gaps detected, a number of liveness issues detected, a number of errors (e.g., 503 errors) returned, a number of failed requests for potentially missing fragments, a number of requests per proxy, a number of errors per proxy).

In some implementations, a log of the recovery procedures can be created and presented to the user. For example, log entries can be created when a recovery procedure is initiated, when a gap is detected and/or resolved, when a liveness issue is detected and/or resolved, when a request for an index or fragment is submitted to a server system or proxy, when an index or fragments are successfully received, when an error from a server system or proxy is returned (e.g., unable to retrieve a requested index or fragment), when an index is updated, when a threshold limit for the recovery procedures is reached, when a detected gap is too large for automatic recovery procedures, and other activities related to media streaming.

In some implementations, a naming convention for the fragment identifiers listed in the media stream index can be determined 220. The naming convention can indicate the sequential arrangement of the fragment identifiers, for example, based on a numbering scheme (e.g., 998, 999, 1000, etc.), time stamps (e.g., 1:00 pm, 1:01 pm, 1:02 pm, etc.), time offsets (e.g., 5 sec., 10 sec., 15 sec., etc.), or a combination thereof. In some implementations, potentially missing fragment identifiers can be identified 230, for example, by comparing a media stream index, or a portion thereof, available at a server system to another index of the same media stream from a different server system, by analyzing the media stream index by itself, or a combination of both. In some implementations, the index comparison recovery procedure can be initiated during boot time initialization and upon user request.

Fragment run entries in the media stream index can include information indicating whether there is a desired discontinuity in the sequentially arranged fragments, such as an end of media stream indicator or a specific fragment identifier (e.g., a fragment number, time stamp, or a combination of both) at which the media stream ends. If the playback of the media stream reaches such a discontinuity indicator, no analysis of the media stream index past the discontinuity indicator may be necessary.

In some implementations, the media stream index can be analyzed during startup of the server system, periodically (e.g., at a predetermined time interval), or at administrator command. At startup, it may be unknown to the server system what media streams were being processed by a media stream source, and media stream indexes for all media streams of a media stream source can be analyzed. For example, to determine liveness occurrences of a media stream, the server system can check a time stamp of a last fragment identifier listed in a media stream index and if the time stamp is older than a specified time value (e.g., a time interval measured by a current time value) and no media stream discontinuity indicator has been detected, the media stream may be stale and a recovery procedure can be initiated. To determine dropout occurrences within a media stream, the server system can scan the media stream index and identify potentially missing fragment identifiers based on the naming convention of the fragment identifiers. Discontinuities of the sequentially arranged fragment identifiers in the media stream index can indicate that fragments are expected to be available, even though the media stream index does not include a fragment identifier corresponding to the potentially missing fragments. For example, a discontinuity in a numbering scheme (e.g., 998, 999, 1000, 1003, 1004), or a discontinuity in time stamps (e.g., 1:00 pm, 1:01 pm, 1:04 pm, 1:05 pm), of the sequential order of fragment identifiers can indicate that fragment identifiers are potentially missing from the index and that fragments corresponding to these potentially missing fragment identifiers are expected to be available.

The identified gap of fragment identifiers can span from a last fragment identifier before the gap to a first fragment identifier listed in the media stream index after the identified gap. In some implementations, fragment identifiers with a time stamp older than a specified time value can be ignored as irrelevant. In some implementations, the appropriate recovery procedure can be determined based on, for example, the size of the gap (e.g., if the gap is too large, for example 10 seconds, no automatic recovery procedure should be employed), the recentness of the gap in relation to a current time value, the server system configuration (e.g., system and network resources), or the number of potentially missing fragments. In some implementations, the recovery procedures can be limited to a maximum number of missing fragments (e.g., more than 1,000 fragments), because recovery of very large gaps can lead to high traffic across the communication network and may take a very long time. In some implementations, periodic analysis of a media stream index can be employed for currently active media streams on a server system based on a set time interval (e.g., every 1 second). For example, the server system can check for liveness occurrences by identifying a time stamp of a last update of the media stream index and if no update has occurred for a specified time interval (e.g., fragment duration or multiples thereof), the index may be stale and is suffering from liveness. Similarly to the process described above, the server system can periodically analyze the index for dropout occurrences. In some implementations, the periodic analysis for dropouts can be performed for a limited range of fragment identifiers. The range of fragment identifiers can be defined, for example by the frequency of the periodic analysis and the fragment duration (or multiples thereof).

In some implementations, a recovery procedure of the media stream index can be initiated by a user (e.g., an administrator). The user can indicate specific media streams to be analyzed. User initiated recovery procedures can be important where automatic recovery procedures are limited to short instances of dropout (e.g., maximum gap duration) or liveness (e.g., maximum time since last fragment time stamp) occurrences.

Such limitations can be implemented to prevent overloading the server system and network when configuring the index recovery procedures. In some implementations, thresholds (e.g., based on time stamps associated with the media stream) for analyzing indexes of media streams can be employed to avoid attempting recovery of outdated and irrelevant media streams. Such thresholds can limit the impact of the recovery procedures on other server systems and the network.

For example, recovery procedures can be limited when a time stamp of a last fragment identifier in a media stream index is older than a specified time interval (e.g., based on a current time value), when a gap is larger than a specified time interval (e.g., a time interval exceeding 10 seconds), when a gap ended more than a specified time interval ago (e.g., based on a current time value), when a total number of potentially missing fragments or potentially missing time intervals is larger than a specified value, or when a time stamp of a potentially missing fragment identifier is closer to a current time value than a specified time interval (e.g., 1-2 fragment durations to prevent initiating a recovery procedure at the live point of a media stream). In some implementations, such limits do not apply if a recovery procedure is initiated by a user (e.g., an administrator)

In some implementations, a second index of the media stream can be requested 240. For example, the server system processing the initial media stream index can request a second index for the same media stream from a different server system or a proxy. The request for the second media stream index can be similar to a request a client system, or a component thereof (e.g., a media player), processing a media stream would submit to a server system or proxy. If the second media stream index is available on the server system or proxy receiving the request, the second media stream index can be returned to the server system submitting the request. In some implementations, the second index can be cashed on the second server system or proxy.

The fragment identifiers listed in the received second media stream index can be compared with the fragment identifiers listed in the initial media stream index 250. For example, the server system comparing the initial and second media stream index can identify fragments listed in the second media stream index that are not present in the initial media stream index 260 or are more limited, and if fragment identifiers are missing in the initial media stream index, the server system can reconstruct the initial media stream index by including the missing fragment identifiers 270. In some implementations, the server system can request the fragments corresponding to the missing fragment identifiers from the server system or proxy that provided the second media stream index until all known missing fragments have been recovered or requests have failed beyond a number of recovery attempts or timeouts.

In some implementations, the server system processing the initial index can continue to request indexes for the media stream from other server systems or the proxy until no more potentially missing fragment identifiers can be identified in the initial media stream index, or no potentially missing fragments are available on any of the other server systems. In some implementations, the media stream index is cached only for a short time on the proxy and the server system requesting another index for the media stream from the proxy would likely extract a media stream index different from the previously received media stream index.

Figure 3:
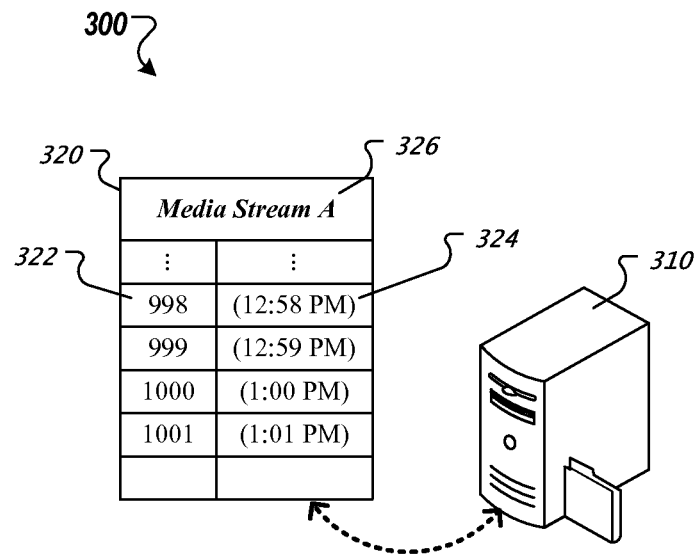
FIG. 3 shows an example of a media stream index with potentially "stale" fragment identifiers (liveness).

FIG. 3 shows an example 300 of a media stream index 320 with potentially stale fragment identifiers. The media stream index 320 available on a server system 310 can, amongst other information, include a media stream name 326 (e.g., "Media Stream A"), fragment identifiers 322, and time stamps 324. In some implementations, the fragment identifiers 322 can include or be equivalent to the time stamps 324. The fragment identifiers 322 can be sequentially arranged (e.g., 998, 999, 1000, etc.) and correspond to the time stamps 324 (e.g., 12:58 PM, 12:59 PM, 13:00 PM, etc.).

The media stream index 320 can be analyzed by a process 200 as described above with respect to FIG. 2. In this example, the analysis of the media stream index 320 may show that the index 320 is potentially "stale" (i.e., suffers from liveness), if the index does not include an end of media stream indicator and the time stamp 324 of the last fragment listed in the index 320 is older than a specified time value (e.g., fragment duration or multiples thereof) based on a current time value.

In some implementations, a recovery procedure can be initiated upon determining that the media stream index 320 is potentially "stale". For example, the server system 310 may expect that the fragment identifiers 322 continue in the same sequential order and increments (e.g., 998, 999, 1000, 1001 indicates an increment of 1) or that a next expected time stamp 324 has the same temporal separation (e.g., 12:58 PM, 12:59 PM, 1:00 PM, 1:01 PM indicates a temporal separation of 1 minute) as shown in the media stream index 320.

The server system 310 can attempt to obtain fragments corresponding to the potentially missing fragment identifiers in sequential order, for example from the proxy, beyond the fragments identified in the media stream index 320 until a last missing fragment has been received, successive errors when requesting the potentially missing fragments have been returned, or a time stamp of the last requested fragment is within a specified time interval of a current time value (e.g., at the live point of the media stream).

Figure 4:
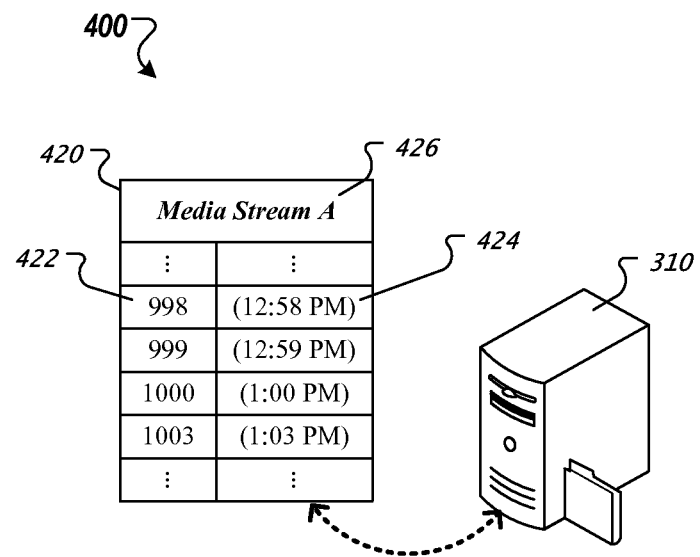
FIG. 4 shows an example of a media stream index with potentially "dropped" fragment identifiers (dropout).

FIG. 4 shows an example 400 of a media stream index 420 with potentially dropped fragment identifiers. A media stream index 420 available on a server system 410 can, amongst other information, include a media stream name 426 (e.g., "Media Stream A"), fragment identifiers 422, and time stamps 424. The fragment identifiers 422 can be sequentially arranged (e.g., 998, 999, 1000, etc.) and correspond to the time stamps 424 (e.g., 12:58 PM, 12:59 PM, 13:00 PM, etc.).

The media stream index 420 can be analyzed by a process 200 as described above with respect to FIG. 2. In this example, the analysis of the media stream index 420 may show that the media stream index 420 is potentially missing fragment identifiers based on the sequential arrangement of the fragment identifiers 422 or the time stamps 424. For example, the analysis can show that the sequentially arranged fragment identifiers 422 are incremented by 1 (i.e., 998, 999, 1000) until the fragment identifier 1000. The next fragment identifier listed in the media stream index 420 is 1003, which indicates that fragment identifiers 1001 and 1002 are potentially missing from the media stream index 420. An analysis of the time stamps 424 may produce a similar result, indicating that fragment identifiers corresponding to the time stamps 1:01 PM and 1:02 PM are potentially missing.

In some implementations, a recovery procedure can be initiated upon determining that the media stream index 420 is potentially missing fragment identifiers. For example, the server system 410 can attempt to obtain every fragment corresponding to a discontinuity of the sequential arrangement of the fragment identifiers 422, or the time stamps 424, in sequential order, until a last missing fragment has been received or successive errors when requesting the potentially missing fragments have been returned.

In some implementations, the throughput of fragment traffic generated as a result of recovery procedures can be limited such that the server systems and networks are not overloaded (e.g., if a large number of fragments is missing on a server system or a failure affects multiple server systems (or sub networks), which may cause the multiple server systems to attempt media stream recovery simultaneously). For example, a server system (e.g., an origin server) requesting potentially missing fragments or indexes can monitor the number of generated fragment or index requests within a given time frame and can wait for a specified time interval before submitting another request. In some implementations, a proxy can include scripts configured to enforce network traffic control and to reduce excessive requests to manage available network resources.

Figure 5:
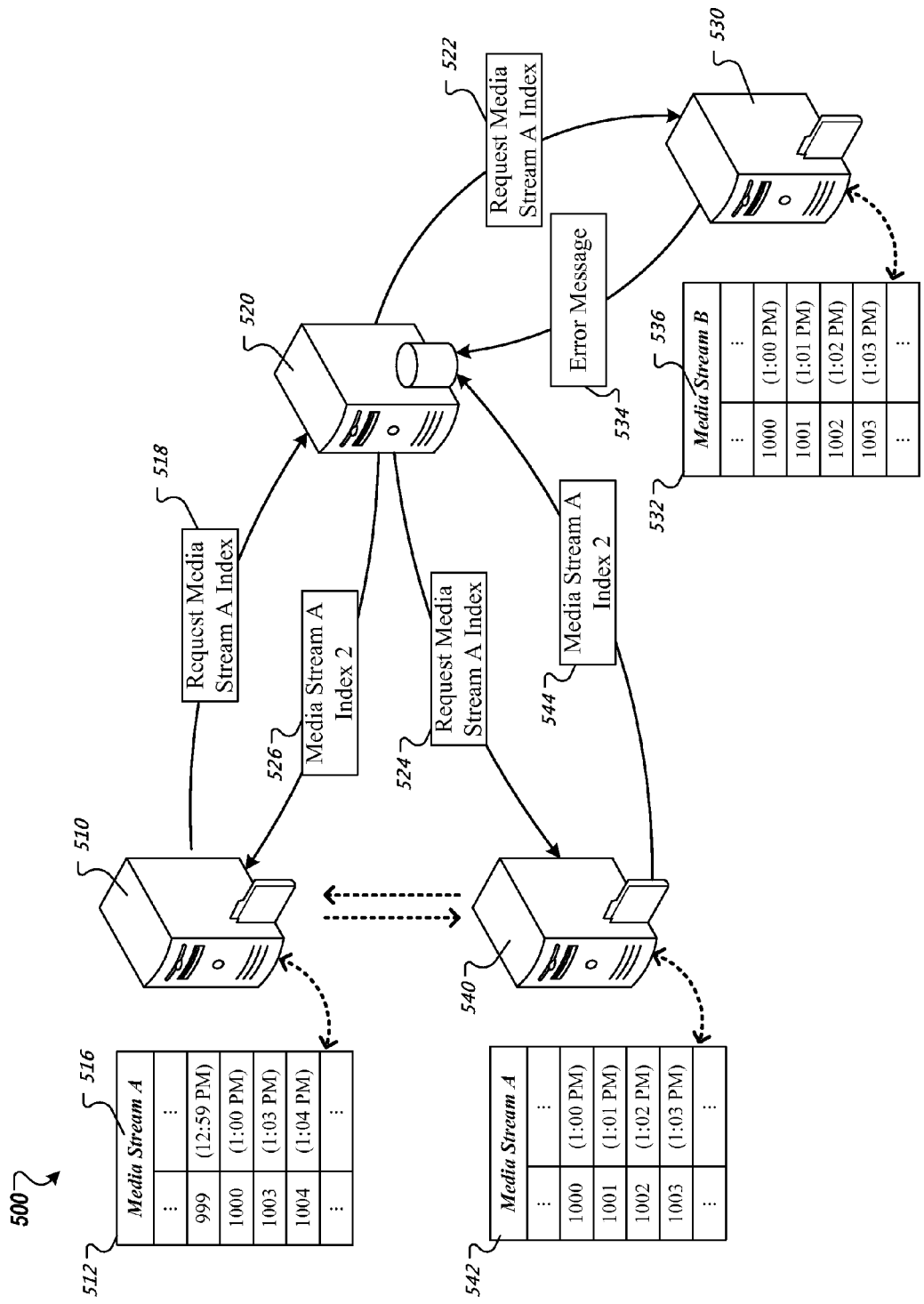
FIG. 5 shows an example of a failover system for requesting a media stream index.

FIG. 5 shows an example of a failover system 500 for requesting a media stream index. In some implementations, server systems, such as server systems 510, 530, and 540 can be communicatively coupled to a proxy 520 (e.g., a reverse proxy server system). A server system connected to the proxy can submit a request for a media stream to the proxy and the proxy can attempt to retrieve the media stream from one or more of the server systems connected to the proxy. In some implementations, the proxy can submit the request for the media stream to a different server system upon receiving an error message, or no response within a defined time interval, from the server system to which the request was initially sent. In some implementations, the proxy can be the server initially requesting the media stream.

For example, with the above described process, server system 510 can identify that a media stream index 512, available at the server system 510, of the media stream 516 is potentially missing fragment identifiers 1001 and 1002, based on the sequentially arranged fragment identifiers. The server system 510 can submit a request 518 to the proxy 520 for a media stream index of the media stream 516, or alternatively, request the potentially missing fragments with the identifier 1001 and 1002. The proxy 520 can request a media stream index, or fragments 1001 and 1002, of the media stream 516 from the server systems connected to the proxy. If proxy 520 submits a request 522 for a media stream index, or fragments 1001 and 1002, of the media stream 516 from server system 530, the server system 530 may return an error message 534 (e.g., a 503 error message) to the proxy 520, because the media stream 536 and index 532 do not match the request for a media stream index, or the potentially missing fragments 1001 and 1002, of the media stream 516.

Upon receiving the error message from the server system 530, the proxy 520 can submit another request 524 to server system 540 for a media stream index, or fragments 1001 and 1002, of the media stream 516. Server system 540 can return 544 a media stream index 542, or fragments 1001 and 1002, for the media stream 516 to the proxy 520 and proxy 520 can return 526 the media stream index 542, or fragments 1001 and 1002, of the media stream 516 to the server system 510. In some implementations, the proxy 520 can submit a request to another server system when the server system to which the request was initially submitted fails to return a response (e.g., the requested index, fragments, or an error message) within a defined time interval.

In some implementations, a proxy can be configured to request a media stream index, or fragments, from every server system connected to the proxy until the requested media stream index or fragments are returned to the proxy, or every connected server system returns an error message. When every server system connected to the proxy returns an error message (or otherwise fails to respond), the proxy can generate an error message and return the error message to the requesting server system indicating that the requested index or fragments do not exist. In some implementations, the proxy caches the error message for a short amount of time (e.g., less than a fragment interval).

Figure 6:
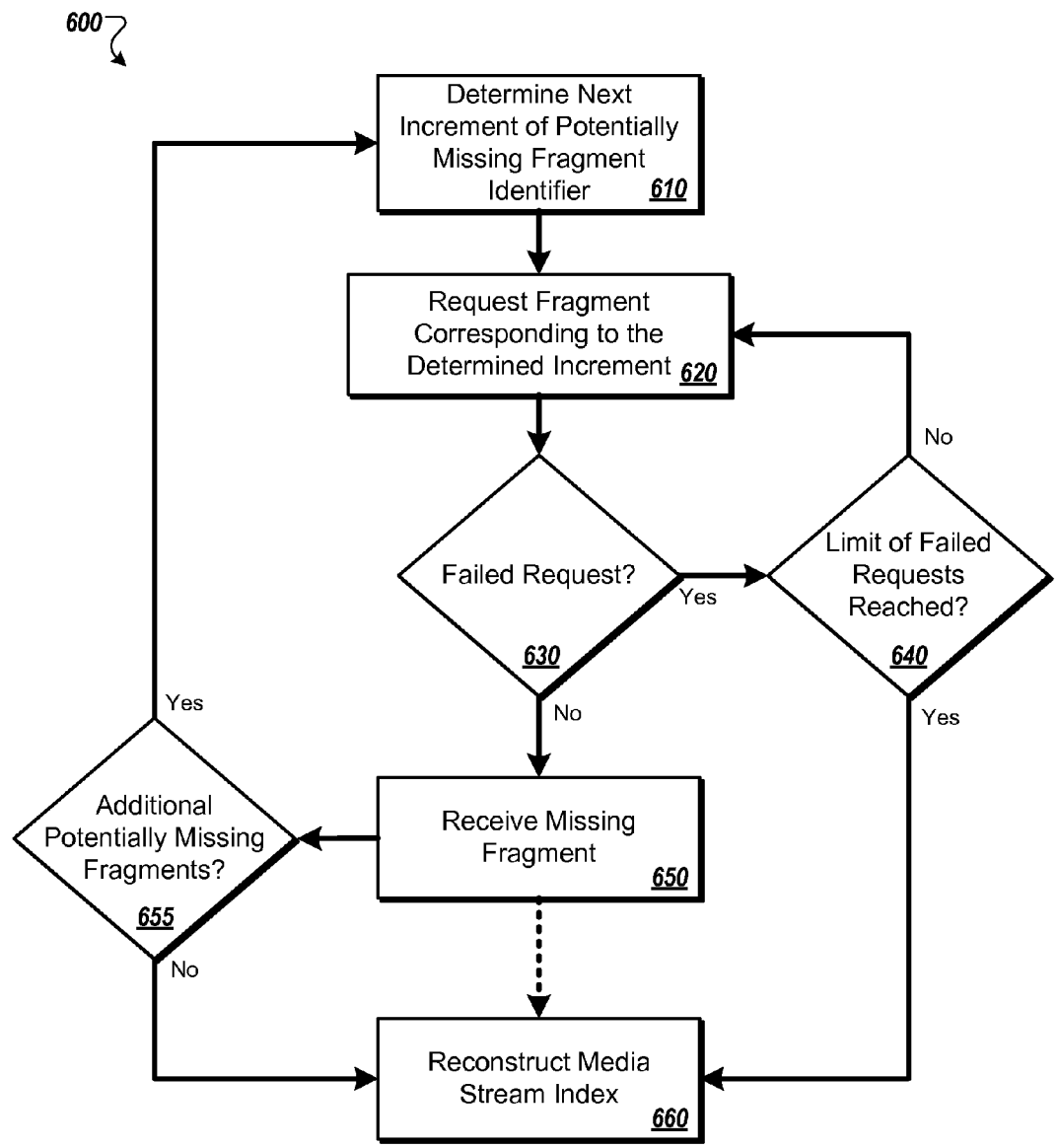
FIG. 6 shows an example of a process for requesting potentially missing fragments of a media stream.

FIG. 6 shows an example of a process 600 for requesting potentially missing fragments of a media stream based on the sequential arrangement of fragment identifiers and reconstructing a media stream index on availability of the requested fragments. Potentially missing fragment identifiers in a media stream index can be identified as described above. Upon identification of a gap (e.g., a range of potentially missing fragment identifiers), a next expected increment of a fragment identifier within the gap can be determined 610. For example, the next expected increment of a potentially missing fragment identifier can be based on a naming convention derived from sequentially arranged fragment identifiers in the media stream index. The naming convention can be based, for example, on a numbering scheme (e.g., 998, 999, 1000, 1001, etc.), time stamps (1:00 PM, 1:01 PM, 1:02 PM, etc.), time offsets (e.g., 5 sec., 10 sec., 15 sec., etc.), or combination thereof.

In some implementations, a first potentially missing fragment can be associated with a next sequential increment of a fragment identifier based on the naming convention. For example, when, based on the naming convention, the expected increment of fragment identifiers is 1 (e.g., sequential fragment identifiers 998, 999, 1000, 1001 indicate an increment between fragment identifiers of 1) and a last fragment identifier in a media stream index before an identified gap is 1001, the next sequential increment of a potentially missing fragment identifier would be 1002.

A fragment corresponding to the next expected increment of a potentially missing fragment identifier can be requested 620. In some implementations, requests for potentially missing fragments can be limited in order to preserve system or network resources (e.g., a request for a particular missing fragment is only submitted once within a defined timeframe). When the request 630 succeeds and the requested fragment corresponding to the potentially missing fragment identifier can be retrieved 650, the fragment can be stored, for example, in a buffer storage and the recovery process can continue if additional potentially missing fragments 655 have been identified. The media stream index can be reconstructed 660 based on the received missing fragments 650. When the identified gap extends past the last received fragment and additional potentially missing fragments 655 have been identified, another potentially missing fragment corresponding to the next sequential increment, in this example 1003, can be requested.

Requesting fragments corresponding to potentially missing fragment identifiers can continue until all potentially missing fragments have been received 655 or until a limit of failed requests has been reached 640. In some implementations, the limit for a number of failed requests 640 can be specified by a user (e.g., an administrator) or based on a size of the identified gap. For example, if the limit of failed requests 640 is set to two, and the requests for fragments corresponding to the potentially missing fragment identifiers 1001 and 1002 fail, the recovery procedure can be aborted until a next dropout or liveness occurrence is identified.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language stream), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending streams to and receiving streams from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, at a first server system, a first index of a media stream, the media stream being fragmented into multiple sequentially arranged fragments, each of the fragments having an associated identifier, the first index comprising a first list of sequentially arranged fragment identifiers corresponding to at least a portion of the media stream;
   identifying, by the first server system, fragment identifiers that are potentially missing from the first index, the identifying comprising identifying a gap in the list of sequentially arranged fragment identifiers based, at least in part, on a determined naming convention that indicates the sequential arrangement of the fragment identifiers;
   requesting, by the first server system and from a proxy server system, a second index of the media stream, the second index comprising at least a second list of sequentially arranged fragment identifiers corresponding to the portion of the media stream, the request causing the proxy server system to:
      request, from a second server system, the second index of the media stream;
      receive, from the second server system, the requested second index of the media stream;
      confirm that the received second index of the media stream matches the request for the second index of the media stream; and
      deliver, to the first server system, the second index of the media stream;
   comparing, by the first server system, the first list of sequentially arranged fragment identifiers and the second list of sequentially arranged fragment identifiers, based, at least in part, on the determined naming convention; and
   reconstructing, by the first server system, the first list of sequentially arranged fragment identifiers based on the comparison, the reconstructed first index including fragment identifiers of the second index that were identified as missing from the first index during the comparing.

2. The method of claim 1, wherein identifying the gap comprises identifying a discontinuity of fragment identifiers in the first list of sequentially arranged fragment identifiers based, at least in part, on the determined naming convention.

3. The method of claim 1, wherein identifying the gap comprises identifying a last fragment identifier in the first list of sequentially arranged fragment identifiers, based, at least in part, on the determined naming convention.

4. The method of claim 3, further comprising:
   identifying an end of media stream indicator in the first index; and
   terminating the request for the second index of the media stream based on the end of media stream indicator.

5. The method of claim 1, wherein the identifying is performed (i) at startup of the first server system, (ii) at a predetermined time interval, and (iii) upon administrative request.

6. The method of claim 1, wherein requesting the second index comprises requesting the second index through a single universal resource identifier.

7. The method of claim 1, wherein the determined naming convention comprises at least one of a time stamp or a numbering scheme.

8. The method of claim 1, wherein receiving the first index comprises receiving portions of the first index after receiving the first index.

9. The method of claim 1, further comprising:
   requesting, by the first server system and from the proxy server system, potentially missing fragments associated with the potentially missing fragment identifiers from the first index, the requesting of potentially missing fragments occurring in series until a predetermined number of requests fail to return a potentially missing fragment;
   receiving, by the first server system and from the proxy server system, one or more of the potentially missing fragments associated with the potentially missing fragment identifiers from the first index; and
   reconstructing, by the first server system, the first list of sequentially arranged fragment identifiers based on the received potentially missing fragments.

10. The method of claim 9, wherein the request further causes the proxy server system to request each potentially missing fragment once from an origin server within a predetermined time interval.

11. The method of claim 1, wherein identifying the gap comprises checking a time stamp of a last update of the index, determining a time difference between the time stamp and a current time value, and comparing the determined time difference to a predetermined time interval.

12. The method of claim 1, wherein the request by the first server system further causes the proxy server system to:
   determine that the second index received from the second server system does not match the request for the second index of the media stream;
   request, responsive to the determination, by the proxy server system, and from a third server system, a third index of the media stream;
   receive, from the third server system, the requested third index of the media stream; and
   confirm that the received third index of the media stream matches the request for the third index of the media stream.

13. The method of claim 1, wherein the request by the first server system further causes the proxy server system to:
  receive, from the second server system, an error message indicating that the second index of the media stream stored on the second server system does not match the requested from the second index of the media stream;
  request, responsive to receipt of the error message, a third index of the media stream from a third server system;
  receive, from the third server system, the requested third index of the media stream; and
  confirm that the received third index of the media stream matches the request for the third index of the media stream.

14. A system comprising:
  a first server system operable to interact with a proxy server system, the first server system comprising a computer storage medium encoded with a computer program, the computer program comprising instructions that when executed by a data processing apparatus cause the first server system to perform operations comprising:
    receiving, at the first server system, a first index of a media stream, the media stream being fragmented into multiple sequentially arranged fragments, each of the fragments having an associated identifier, the first index comprising a first list of sequentially arranged fragment identifiers corresponding to at least a portion of the media stream;
    identifying, by the first server system, fragment identifiers that are potentially missing from the first index, the identifying comprising identifying a gap in the list of sequentially arranged fragment identifiers based, at least in part, on a determined naming convention that indicates the sequential arrangement of the fragment identifiers;
    requesting, by the first server system and from the proxy server system, a second index of the media stream, the second index comprising at least a second list of sequentially arranged fragment identifiers corresponding to the portion of the media stream, the request causing the proxy server system to:
      request, from a second server system, the second index of the media stream;
      receive, from the second server system, the requested second index of the media stream;
      confirm that the received second index of the media stream matches the request for the second index of the media stream; and
      deliver, to the first server system, the second index of the media stream;
    comparing, by the first server system, the first list of sequentially arranged fragment identifiers and the second list of sequentially arranged fragment identifiers, based, at least in part, on the determined naming convention; and
    reconstructing, by the first server system, the first list of sequentially arranged fragment identifiers based on the comparison.

15. The system of claim 14, wherein identifying the gap comprises identifying a discontinuity of fragment identifiers or a last fragment identifier in the first list of sequentially arranged fragment identifiers based, at least in part, on the determined naming convention.

16. The system of claim 14, wherein the second server system is a first origin server of a plurality of origin servers.

17. The system of claim 16, wherein the request further causes the proxy server system to request the second index from a second origin server of the plurality of origin servers (i) if the first origin server fails to return the second index within a predetermined time interval or (ii) upon receiving an error message in response to requesting the second index from the first origin server.

18. The system of claim 14, the operations further comprising:
  requesting, by the first server system and from the proxy server system, potentially missing fragments associated with the potentially missing fragment identifiers from the first index, the requesting of potentially missing fragments occurring in series until a predetermined number of requests fail to return a potentially missing fragment;
  receiving, by the first server system, one or more of the potentially missing fragments associated with the potentially missing fragment identifiers from the first index; and
  reconstructing, by the first server system, the first list of sequentially arranged fragment identifiers based on the received potentially missing fragments.

19. A computer storage medium encoded with a computer program, the program comprising instructions that when executed by data processing apparatus cause the data processing apparatus to perform operations comprising:
  receiving, at a first server system, a first index of a media stream, the media stream being fragmented into multiple sequentially arranged fragments, each of the fragments having an associated identifier, the first index comprising a first list of sequentially arranged fragment identifiers corresponding to at least a portion of the media stream;
  identifying, by the first server system, fragment identifiers that are potentially missing from the first index, the identifying comprising identifying a gap in the list of sequentially arranged fragment identifiers based, at least in part, on a determined naming convention that indicates the sequential arrangement of the fragment identifiers;
  requesting, by the first server system and from a proxy server system, a second index of the media stream, the second index comprising at least a second list of sequentially arranged fragment identifiers corresponding to the portion of the media stream, the request causing the proxy server system to:
    request, from a second server system, the second index of the media stream;
    receive, from the second server system, the requested second index of the media stream;
    confirm that the received second index of the media stream matches the request for the second index of the media stream; and
    deliver, to the first server system, the second index of the media stream;
  comparing, by the first server system, the first list of sequentially arranged fragment identifiers and the second list of sequentially arranged fragment identifiers, based, at least in part, on the determined naming convention; and
  reconstructing, by the first server system, the first list of sequentially arranged fragment identifiers based on the comparison.

20. The computer storage medium of claim 19, the operations further comprising:
  requesting, by the first server system and from the proxy server system, potentially missing fragments associated with the potentially missing fragment identifiers from the first index, the requesting of potentially missing fragments occurring in series until a predetermined number of requests fail to return a potentially missing fragment;

receiving, by the first server system and from the proxy server system, one or more of the potentially missing fragments associated with the potentially missing fragment identifiers from the first index; and reconstructing, by the first server system, the first list of sequentially arranged fragment identifiers based on the received potentially missing fragments.

* * * * *